United States Patent
Katti

(10) Patent No.: US 10,082,431 B2
(45) Date of Patent: Sep. 25, 2018

(54) SYSTEM AND METHODS FOR MAGNETIC TUNNEL JUNCTION PRESSURE SENSORS

(71) Applicant: Honeywell International Inc., Morristown, NJ (US)

(72) Inventor: Romney R. Katti, Shorewood, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/839,301

(22) Filed: Aug. 28, 2015

(65) Prior Publication Data
US 2017/0016784 A1    Jan. 19, 2017

Related U.S. Application Data

(60) Provisional application No. 62/193,742, filed on Jul. 17, 2015.

(51) Int. Cl.
*G01L 1/16* (2006.01)
*G01L 1/12* (2006.01)

(52) U.S. Cl.
CPC ............... *G01L 1/125* (2013.01); *G01L 1/16* (2013.01)

(58) Field of Classification Search
CPC ... G01L 1/12; G01L 1/14; G01L 1/125; G11C 11/00
USPC ...................................................... 73/862.69
See application file for complete search history.

(56) References Cited

U.S. PATENT DOCUMENTS

| | | | |
|---|---|---|---|
| 5,165,284 A | 11/1992 | Shoji et al. | |
| 6,756,237 B2 * | 6/2004 | Xiao | B82Y 25/00 257/E43.006 |
| 7,059,201 B2 * | 6/2006 | Prakash | G01L 1/125 73/862.041 |
| 7,234,360 B2 * | 6/2007 | Quandt | G01L 1/125 73/779 |
| 7,541,804 B2 | 6/2009 | Chung et al. | |
| 7,547,480 B2 | 6/2009 | Chung et al. | |

(Continued)

FOREIGN PATENT DOCUMENTS

EP    0889521    1/1999

OTHER PUBLICATIONS

European Patent Office, "European Search Report for EP Application No. 16178512.6", "from U.S. Appl. No. 14/839,301", dated Dec. 8, 2016, pp. 1-8, Published in: EP.

(Continued)

*Primary Examiner* — Jonathan Dunlap
*Assistant Examiner* — Octavia Hollington
(74) *Attorney, Agent, or Firm* — Fogg & Powers LLC

(57) ABSTRACT

System and methods for magnetic Tunnel Junction pressure sensors are provided. In at least one implementation, a pressure sensor device comprises a magnetic tunnel junction comprising a free layer structure, a tunnel barrier, and a reference layer structure, wherein one or more surfaces of the free layer structure is exposed to respond to a pressure medium; and a voltage source coupled to the magnetic tunnel junction, the voltage source providing electrical power to the free layer structure and the reference layer structure. The device further comprises a current detector coupled between the magnetic tunnel junction and the voltage source; and a pressure calculating device, configured to calculate a pressure based on a current detected by the current detector.

14 Claims, 4 Drawing Sheets

(56) References Cited

U.S. PATENT DOCUMENTS

| | | | |
|---|---|---|---|
| 7,902,616 B2* | 3/2011 | Klostermann | H01L 27/226 257/421 |
| 8,973,446 B2 | 3/2015 | Fukuzawa et al. | |
| 8,975,891 B2* | 3/2015 | Pant | G01R 33/098 324/252 |
| 9,093,163 B2* | 7/2015 | Wunderlich | G11C 11/16 |
| 9,171,601 B2* | 10/2015 | Shukh | G11C 11/16 |
| 2002/0073785 A1 | 6/2002 | Prakash et al. | |
| 2014/0369530 A1 | 12/2014 | Fuji et al. | |

OTHER PUBLICATIONS

European Patent Office, "Invitation Pursuant to Article 94(3) and Rule 71(1) for EP Application 16178512.6", "Foreign Counterpart to U.S. Appl. No. 14/839,301", dated Sep. 4, 2017, pp. 1-6, Published in: EP.

Bozorth, "Ferromagnetism", 1978 (1951), pp. 482 and 637, Publisher: D. Van Nostrand Company, Inc., Published in: Princeton, N.J.

Chikazumi et al, "Physics of Magnetism", 1984 (1964), pp. 161-163, Publisher Robert E Kreiger Publishing Company, Published in: Malabar, Florida.

Geoffroy et al, "Practical and Theoretical Investigations of a Rotating Coilless Actuator Using the Inverse Magnetostrictive Effect", "IEEE Transactions on Magnetics", Feb. 1, 2010, pp. 606-609, vol. 46, No. 2, Publisher: IEEE.

O'Handley, "Modem Magnetic Materials: Principles and Applications,", 2000, p. 225 Publisher: Wiley Interscience, Published in: New York.

European Patent Office, "Summons to Attend Oral Proceedings Pursuant to Rule 115(1) for EP Application No. 16178512.6", "Foreign Counterpart to U.S. Appl. No. 14/839,301", Jan. 23, 2018, pp. 1-7, Published in: EP.

* cited by examiner

SYSTEM AND METHODS FOR MAGNETIC TUNNEL JUNCTION PRESSURE SENSORS

CROSS-REFERENCE TO RELATED APPLICATIONS

This application claims the benefit of U.S. Provisional Patent Application Ser. No. 62/193,742, filed on Jul. 17, 2015, which is hereby incorporated herein by reference.

BACKGROUND

In certain applications, pressure sensors are used to determine the pressure within an environment. For example, pressure sensors may be used to determine the pressure inside or outside of an airplane among other possible implementations. In some applications, the pressure is measured with piezo-resistive sensors, where the resistance changes due to pressure applied to a surface. However, with this and other technologies for producing pressure sensors, there are limitations in both production and performance.

SUMMARY

System and methods for magnetic Tunnel Junction pressure sensors are provided. In at least one implementation, a pressure sensor device comprises a magnetic tunnel junction comprising a free layer structure, a tunnel barrier, and a reference layer structure, wherein one or more surfaces of the free layer structure is exposed to respond to a pressure medium; and a voltage source coupled to the magnetic tunnel junction, the voltage source providing electrical power to the free layer structure and the reference layer structure. The device further comprises a current detector coupled between the magnetic tunnel junction and the voltage source; and a pressure calculating device, configured to calculate a pressure based on a current detected by the current detector.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
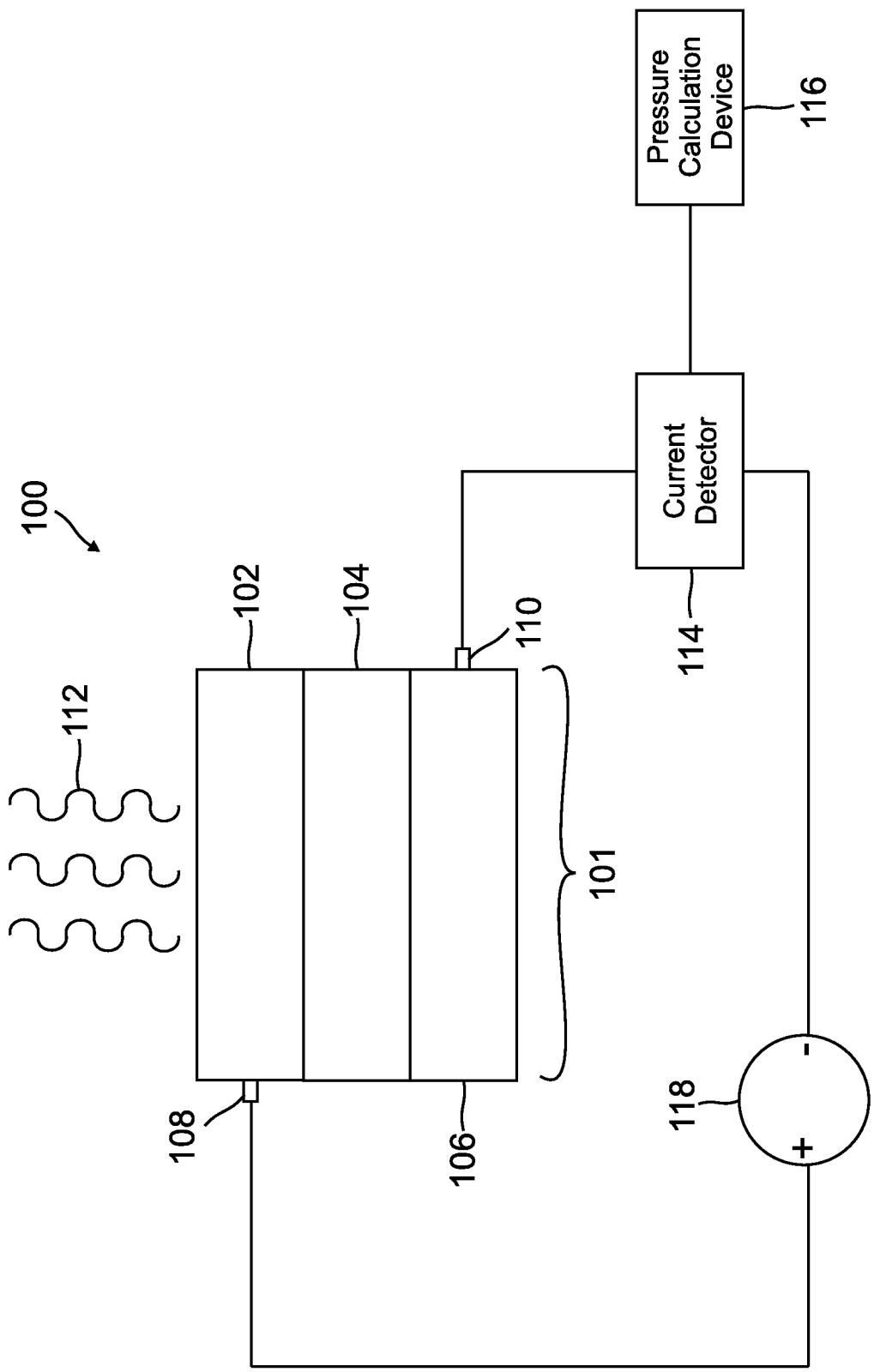
FIG. 1 is a block diagram of a pressure sensing system in one embodiment described in the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments described herein provide for systems and methods for producing pressure sensors that use magnetic tunnel junctions (MTJs). For example, an MTJ structure for sensing pressure may include a magneto-strictive free layer, a reference layer, and a tunnel barrier that separates the free layer from the reference layer. The free layer may have a surface affected by pressure in a medium. The medium may cause either tensile or compressive pressure to be applied to the free layer. The magnetization in this free layer may respond to pressure by changing the axis of magnetization, including the average magnetization direction, while the axis of magnetization for the reference layer is set to a reference direction. As the magnetization direction changes in the free layer, the resistance to electrical currents of the MTJ also changes. Based on the resistance to electrical currents of the MTJ, a current passing through the MTJ can be monitored to determine the pressure on the free layer.

FIG. 1 is a block diagram illustrating a pressure sensing system 100 that uses an MTJ 101 to directly sense the pressure in a medium 112. As shown in FIG. 1, the MTJ 101 includes three layers, a free layer structure 102, intermediate tunneling layers 104, and a reference layer structure 106. The free layer structure 102 and the reference layer structure 106 are made of magnetic materials that have a specific axis of magnetization. The axis of magnetization for the free layer structure 102 changes in response to pressure caused by a pressure medium 112. For example, the axis of magnetization of the free layer structure 102 may change in response to both tensile and compressive forces exerted by the pressure medium 112. Further, the pressure medium 112 may be any object that exerts a force on the free layer structure 102. For example, the pressure medium 112 may be a fluid having a pressure ranging from greater than to less than 1 atmosphere. In contrast to the free layer structure 102, the reference layer structure 106 has an axis of magnetization that is pinned to a particular orientation. That is, the axis of magnetization for the reference layer structure 106 does not change in response to pressure. In between the free layer structure 102 and the reference layer structure 106 is one or more intermediate layers 104. There may be a single tunnel barrier or a series of different layers between the free layer structure 102 and the reference layer structure 106.

As illustrated, in FIG. 1, the free layer structure 102 is connected to an electrode 108 that receives an electrical current from a power source 118, such as a voltage source. The power source 118 is coupled to the free layer 108 through electrode 108 and provides power to the free layer structure 102 of the MTJ 101. The electrode 108 is coupled in such a way that the electrode 108 and any wiring or circuitry does not interfere with the pressure medium 112 becoming incident on a surface of the free layer structure 102. For example, the electrode 108 may be on a surface of the free layer structure 102 that is not in contact with the intermediate layers 104. The power source 118 also is coupled to the reference layer structure 106 through electrode 110. In a similar manner to the electrode 108, the electrode 110 may be coupled to a surface of the reference layer structure 106 that is not in contact with the intermediate layers 104. When the power source 118 provides power, an electrical current is generated through the MTJ 101 because of the tunnel magneto-resistance (TMR) effect, where electrons tunnel between the free layer structure 102 and the reference layer structure 106 through the one or more intermediate layers 104. Alternatively, anisotropic magneto-resistance and giant magneto-resistance effects can also be used to generate a current through the MTJ 101. In the implementation, where the TMR effect is used, the one or more intermediate layers 104 may be a thin insulator that separates the free layer structure 102 from the reference layer structure 106. In alternative embodiments, the tunneling layers 104 may also include a coupled free layer. In a further implementation, the one or more tunneling layers 104 may include both a coupled free layer and a coupling-modulating interlayer. Due to the electrons tunneling through the one or more tunneling layers 104, when a current is applied through the MTJ 101 by the power source 118, the current passes through the MTJ 101 from the coupled free layer electrode 108 to the reference layer electrode 110. In certain implementations, where the pressure medium 112 may be capable of damaging the MTJ 101, the MTJ 101 or a portion of the MTJ 101 that is exposed to the pressure medium 112 is coated with a protective barrier such as silicon dioxide or other protective material that still allows the pressure medium to affect the axis of magnetization of the free layer structure 102. Alternatively, the free layer structure 102 may be encapsulated within an inelastic, or relatively inelastic, layer that provides passivation to the MTJ 101 while transmitting the pressure from the pressure medium to the free layer structure 102.

As described herein, when the current passes through the MTJ 101, the MTJ 101 has a resistance that is dependent on the magnetization direction of the free layer structure 102 in relation to the reference layer structure 106. In one implementation, when the directions of magnetization for the free layer structure 102 and the reference layer structure 106 are parallel (i.e., oriented in the same direction), the MTJ 101 has a low resistance. Further, when the free layer structure 102 experiences pressure from the pressure medium 112, the direction of magnetization changes in the free layer structure 102. When the direction of magnetization changes and differs from the direction of magnetization in the reference layer structure 106, the resistance also changes. For example, the resistance may increase. As the resistance changes, the current through the MTJ 101 also changes. Accordingly, a current detector 114, coupled in series with the MTJ 101 and the power source, detects changes in the current passing through the MTJ 101. For example, the current detector 114 may be a current monitor. Alternatively, the current detector 114 may be a resistor. When the current is being measured, the current detector 114 provides a signal to a pressure calculation device 116 that calculates the pressure based on the current passing through the MTJ 101. The pressure calculation device 116 may be a processor, digital or analog circuitry, or other devices capable of using the detected pressure for a desired means. As such, the MTJ 101 is able to be used as a pressure sensing device.

Figure 2A:
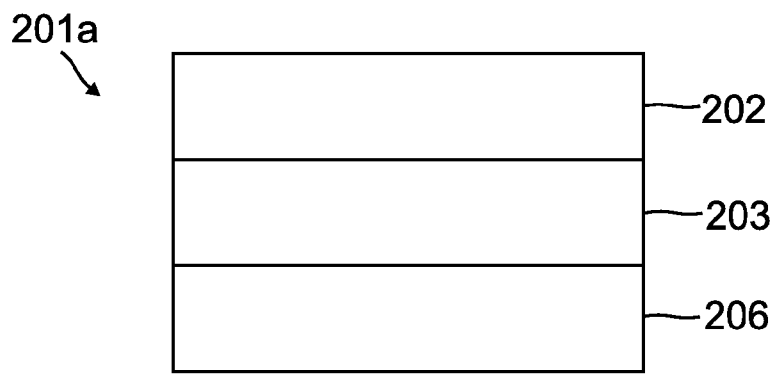
FIGS. 2A-2C are block diagrams of a magnetic tunnel junctions in different embodiments described in the present disclosure.
Figure 2B:
Figure 2C:
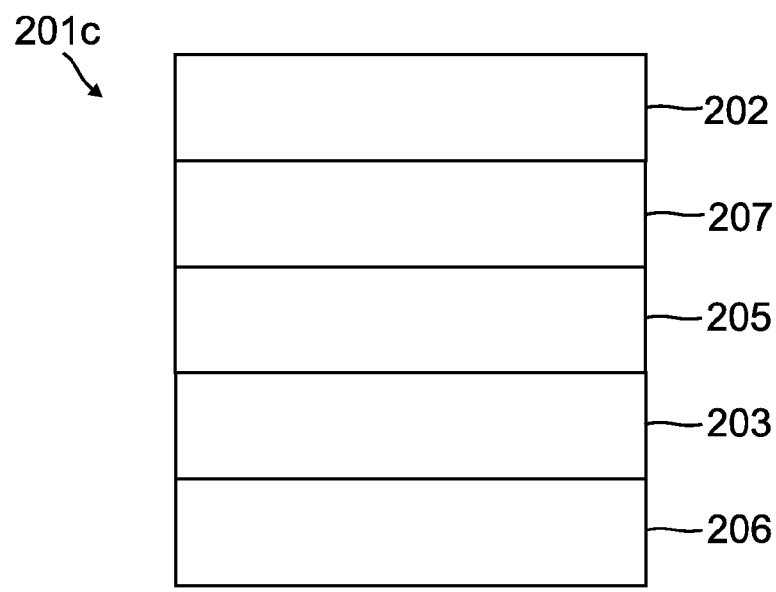

FIGS. 2A-2C illustrate different implementations of MTJs such as the MTJ 101 described above in connection with FIG. 1. For example, FIG. 2A illustrates an MTJ 201a having only a tunnel barrier 203 separating the free layer structure 202 from the reference layer structure 206. As shown herein, the free layer structure 202 may be fabricated from one of many different materials. For example, the free layer structure 202 may be fabricated from at least one of Ni, Fe, NiFe, FeAl (Alfer), TbDyFe (Terfenol-D), FeGa, TbFe, TbFe$_2$, or other materials suitable for providing the desired functionality. The reference layer structure 206 can be fabricated using at least one of NiMn, PtMn, IrMn, FeMn, for example, in association with one or more ferromagnets, or other materials suitable for functioning as a reference layer. The tunnel barrier 203 may be fabricated from at least one of AlOx, MgO, or other materials suitable for functioning as a tunnel barrier. In fabricating the various layers of the MTJ 201a, different processes used in fields of thin film technology may be used. For example, the materials of the various layers in the MTJ 201 a may be fabricated using magnetron sputter deposition, molecular beam epitaxy, pulsed laser deposition, electron beam physical vapor deposition, and photolithography, among other processes.

When operating using different implementations, the MTJ 201 a may exhibit the following exemplary ranges during operation. For example, the MTJ 201 a may have a range of 80 MPa using Ni for the free layer structure 202 with 1° of angular resolution for the rotation of the direction of magnetization for the free layer structure 202. Alternatively, the MTJ 201a may have a range of 35 MPa using NiFe for the free layer structure 202 with 1° of angular resolution for the rotation of the direction of magnetization for the free layer structure 202. Further, the MTJ 201 a may have a range of 2.6 MPa using TbDyFe for the free layer structure 202 with 1° of angular resolution for the rotation of the direction of magnetization for the free layer structure 202. Also, the MTJ 201 a may have a range of 1.1 MPa using TbFe for the free layer structure 202 with 1° of angular resolution for the rotation of the direction of magnetization for the free layer structure 202.

FIG. 2B illustrates an MTJ 201b that includes a coupled free layer 205 between a tunnel barrier 203 and a free layer structure 202. The coupled free layer 205 is used to allow further control of the magnetization and the spin conduction profile of the magnetoresistance. For example, the addition of the coupled free layer 205 permits different angles for the rotation of the axis in the coupled free layer. It may also provide for a more desired magnetoresistance. In certain implementations, the coupled free layer may be fabricated from ferromagnets such as Ni, Fe, NiFe, CoFe, CoNiFe, among other materials.

FIG. 2C illustrates an MTJ 201c that includes a coupling-modulated interlayer 207 between a coupled free layer 205 and a free layer structure 202. The coupling-modulated interlayer 207 allows the separation of magnetization coupling from the magnetoresistance. In particular, the coupled free layer 205 is chosen to optimize the magnetoresistance, the coupling-modulated interlayer 207 is used to optimize the spin conduction profile. In certain implementations, the coupling-modulated interlayer 207 may be fabricated from Cu, Ru, or other suitable materials that permit the desired functionality.

Figure 3A:
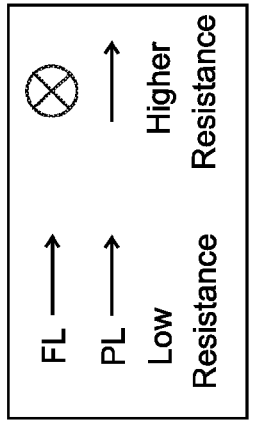
FIGS. 3A-3E are a series of diagrams illustrating different axes of magnetization for a free layer of a magnetic tunnel junction in different embodiments described in the present disclosure.
Figure 3B:
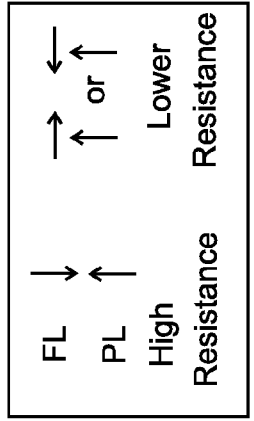
Figure 3C:
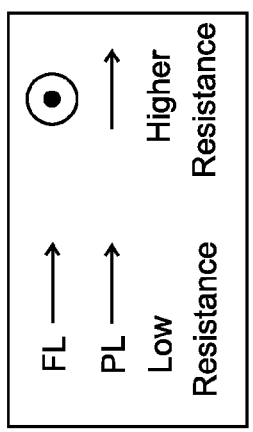
Figure 3D:
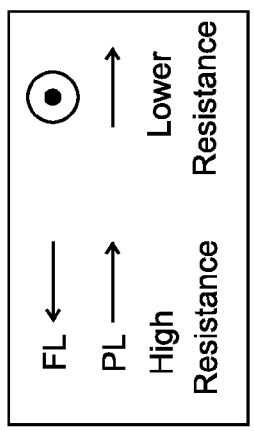
Figure 3E:
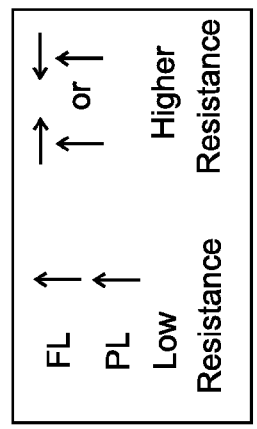

FIGS. 3A-3E illustrate different rotational direction configurations for a free layer structure (FL) in relation to the reference (or pinned) layer structure (PL). For example, FIGS. 3A-3C illustrates a FL where the magnetization direction rotates within the plane of the free layer. FIGS. 3A and 3B are similar to one another, with the exception that the direction of magnetization of the FL rotates in different directions within the same plane. FIG. 3C illustrates an implementation where the FL and the PL are initially set to a higher resistance, as illustrated by the magnetization directions being in opposite directions and then in response to decreasing pressure, the direction of magnetization of the FL moves such that the resistance decreases. In contrast to FIGS. 3A-3C, FIGS. 3D-3E illustrate implementations where, the direction of magnetization changes in a plane perpendicular to the plane of the FL and the PL. For example, FIG. 3D is similar to the embodiment shown in FIG. 3C, with the exception that the magnetization changes in a plane perpendicular to the plane of the FL. FIG. 3E corresponds is similar to the embodiments of either FIG. 3A or 3B.

Figure 4:
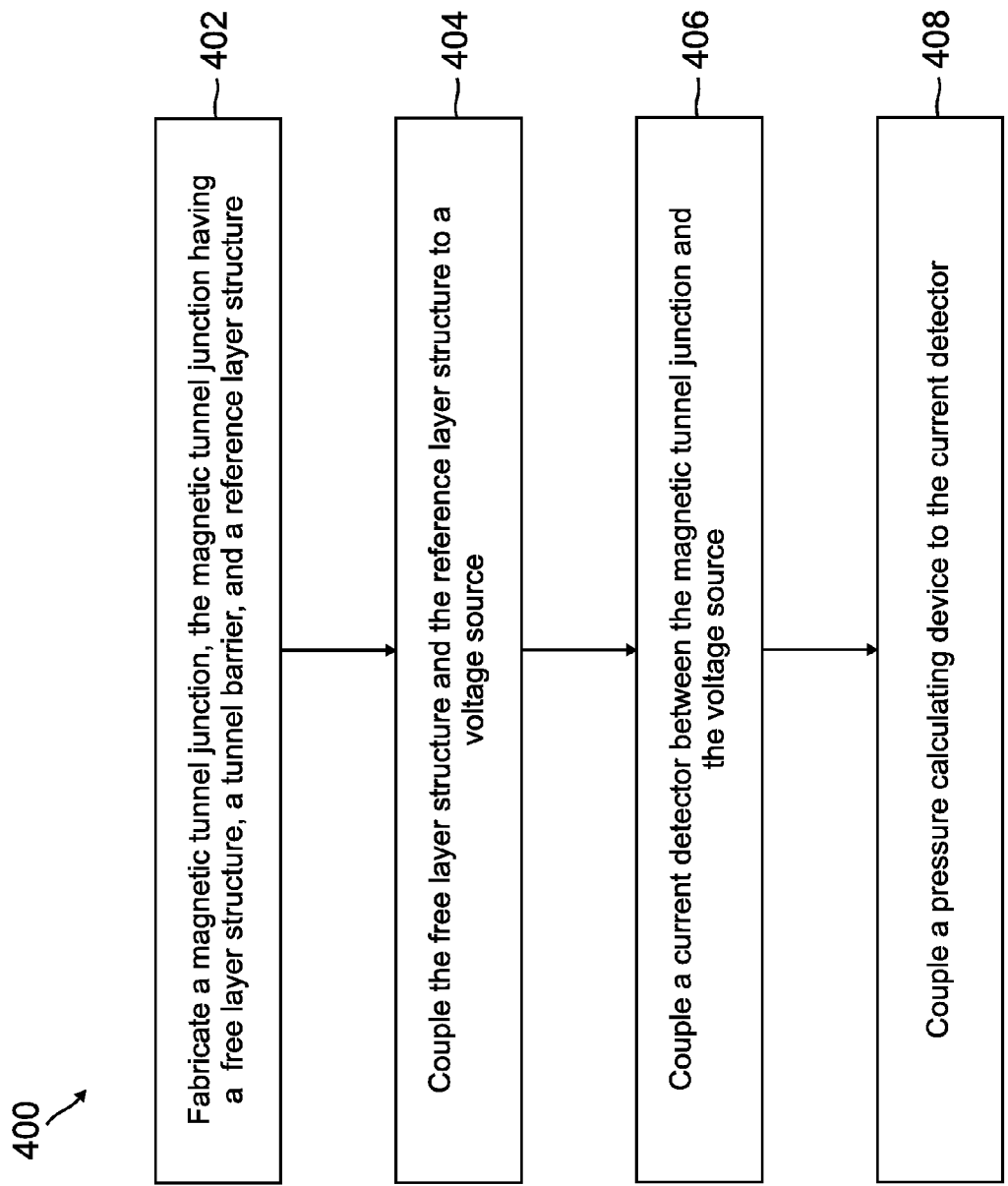
FIG. 4 is a flow diagram illustrating a method for fabricating a pressure sensor in one embodiment described in the present disclosure.

FIG. 4 is a method 400 for fabricating a pressure sensor using an MTJ. Method 400 proceeds at 402, where a magnetic tunnel junction is fabricated, where the magnetic tunnel junction includes a free layer structure, a tunnel barrier, and a reference layer structure. Further, the free layer structure is fabricated such that at least one surface will be exposed to a pressure medium. Method 400 proceeds at 404, where the free layer structure and reference layer structure are coupled to a voltage source. Method 400 proceeds at 406 where a current detector is coupled between the magnetic tunnel junction and the voltage source. Method 400 proceeds at 408, where a pressure calculating device is coupled to the current detector. The pressure calculating device uses the current measurements to determine the pressure exerted by the pressure medium on the MTJ.

EXAMPLE EMBODIMENTS

Example 1 includes a pressure sensor device, the pressure sensor device comprising: a magnetic tunnel junction comprising a free layer structure, a tunnel barrier, and a reference layer structure, wherein one or more surfaces of the free layer structure is exposed to respond to a pressure medium; a voltage source coupled to the magnetic tunnel junction, the voltage source providing electrical power to the free layer structure and the reference layer structure; a current detector coupled between the magnetic tunnel junction and the voltage source; and a pressure calculating device, configured to calculate a pressure based on a current detected by the current detector.

Example 2 includes the pressure sensor device of Example 1, wherein the surface of the free layer structure is coated with a passivation layer.

Example 3 includes the pressure sensor device of any of Examples 1-2, wherein a free layer magnetization direction of the free layer structure and a reference layer magnetization direction of the reference layer structure are parallel to planes of the free layer structure and the reference layer structure.

Example 4 includes the pressure sensor device of Example 3, wherein the free layer magnetization direction of the free layer structure is initially configured to be in a same direction of the reference layer magnetization direction, wherein the free layer magnetization is configured to rotate within the plane of the free layer structure when the pressure of the pressure medium changes.

Example 5 includes the pressure sensor device of any of Examples 3-4, wherein the free layer magnetization direction of the free layer structure is initially configured to be in an opposite direction of the reference layer magnetization direction, wherein the free layer magnetization is configured to rotate within the plane of the free layer structure when the pressure of the pressure medium changes.

Example 6 includes the pressure sensor device of any of Examples 1-5, wherein a free layer magnetization direction of the free layer structure has magnetization directions that rotates in a magnetization planes that is perpendicular to a plane of the free layer structure when the pressure of the pressure medium changes.

Example 7 includes the pressure sensor device of any of Examples 1-6, further comprising a coupled free layer between the free layer structure and the tunnel barrier.

Example 8 includes the pressure sensor device of Example 7, further comprising a coupling modulated interlayer between the coupled free layer and the free layer structure.

Example 9 includes a method for fabricating a pressure sensor, the method comprising: fabricating a magnetic tunnel junction, the magnetic tunnel junction comprising a free layer structure, a reference layer structure, and a tunnel barrier between the free layer structure and the reference layer structure, wherein one or more surfaces of the free layer structure respond to pressure exerted on the one or more surfaces by a pressure medium; coupling the free layer structure and the reference layer structure to a voltage source; coupling a current detector between the magnetic tunnel junction and the voltage source; and coupling a pressure calculating device to the current detector.

Example 10 includes the method of Example 9, further comprising coating the one or more surfaces of the free layer structure with a passivation layer.

Example 11 includes the method of any of Examples 9-10, wherein a free layer magnetization direction of the free layer structure and a reference layer magnetization direction of the reference layer structure are parallel to planes of the free layer structure and the reference layer structure.

Example 12 includes the method of Example 11, wherein the free layer magnetization direction of the free layer structure is initially configured to be in a same direction of the reference layer magnetization direction, wherein the free layer magnetization is configured to rotate within the plane of the free layer structure when the pressure of the pressure medium changes.

Example 13 includes the method of any of Examples 11-12, wherein the free layer magnetization direction of the free layer structure is initially configured to be in an opposite direction of the reference layer magnetization direction, wherein the free layer magnetization is configured to rotate within the plane of the free layer structure when the pressure of the pressure medium changes.

Example 14 includes the method of any of Examples 9-13, wherein a free layer magnetization direction of the free layer structure has magnetization directions that rotates in a magnetization planes that is perpendicular to a plane of the free layer structure when the pressure of the pressure medium changes.

Example 15 includes the method of any of Examples 9-14, further comprising fabricating a coupled free layer between the free layer structure and the tunnel barrier.

Example 16 includes the method of Example 15, further comprising fabricating a coupling modulated interlayer between the coupled free layer and the free layer structure.

Example 17 includes an apparatus, the apparatus comprising: a free layer structure having one or more exposed surfaces, wherein the free layer structure has a free layer magnetization direction that changes in response to pressure exerted on the one or more surfaces by a pressure medium; a reference layer structure having a fixed magnetization direction; a tunnel barrier bonded to and between the free layer structure and the reference layer structure; a voltage source coupled to and providing power to the free layer structure and the reference layer structure; a current detector configured to detect the current provided by the voltage source; and a pressure calculating device, configured to calculate a pressure based on a current detected by the current detector.

Example 18 includes the apparatus of Example 17, further comprising a coupled free layer between the free layer structure and the tunnel barrier.

Example 19 includes the apparatus of any of Examples 17-18, further comprising a coupling modulated interlayer between the coupled free layer and the free layer structure.

Example 20 includes the apparatus of any of Examples 17-19, wherein the one or more exposed surfaces are coated with a passivation layer.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

The invention claimed is:

1. A pressure sensor device, comprising:
   a magnetic tunnel junction comprising:
   a free layer structure;
   a tunnel barrier;
   a coupled free layer between the free layer structure and the tunnel barrier;
   a coupling modulated interlayer adjacent to and in direct contact with the free layer structure and between the coupled free layer and the free layer structure; and
   a reference layer structure, wherein one or more surfaces of the free layer structure is exposed to respond to a pressure medium;
   a voltage source coupled to the magnetic tunnel junction, the voltage source providing electrical power to the free layer structure and the reference layer structure;
   a current detector coupled between the magnetic tunnel junction and the voltage source; and
   a pressure calculating device, configured to calculate a pressure based on a current detected by the current detector.

2. The pressure sensor device of claim 1, wherein the surface of the free layer structure is coated with a passivation layer.

3. The pressure sensor device of claim 1, wherein a free layer magnetization direction of the free layer structure and a reference layer magnetization direction of the reference layer structure are parallel to planes of the free layer structure and the reference layer structure.

4. The pressure sensor device of claim 3, wherein the free layer magnetization direction of the free layer structure is initially configured to be in a same direction of the reference layer magnetization direction, wherein the free layer magnetization is configured to rotate within the plane of the free layer structure when the pressure of the pressure medium changes.

5. The pressure sensor device of claim 3, wherein the free layer magnetization direction of the free layer structure is initially configured to be in an opposite direction of the reference layer magnetization direction, wherein the free layer magnetization is configured to rotate within the plane of the free layer structure when the pressure of the pressure medium changes.

6. The pressure sensor device of claim 1, wherein a free layer magnetization direction of the free layer structure has magnetization directions that rotates in a magnetization planes that is perpendicular to a plane of the free layer structure when the pressure of the pressure medium changes.

7. A method for fabricating a pressure sensor, comprising:
   fabricating a magnetic tunnel junction, the magnetic tunnel junction comprising a free layer structure, a reference layer structure, and a tunnel barrier between the free layer structure and the reference layer structure;
   fabricating a coupled free layer between the free layer structure and the tunnel barrier; and
   fabricating a coupling modulated interlayer adjacent to and in direct contact with the free layer structure and between the coupled free layer and the free layer structure,
   wherein one or more surfaces of the free layer structure respond to pressure exerted on the one or more surfaces by a pressure medium;
   coupling the free layer structure and the reference layer structure to a voltage source;
   coupling a current detector between the magnetic tunnel junction and the voltage source; and
   coupling a pressure calculating device to the current detector.

8. The method of claim 7, further comprising coating the one or more surfaces of the free layer structure with a passivation layer.

9. The method of claim 7, wherein a free layer magnetization direction of the free layer structure and a reference layer magnetization direction of the reference layer structure are parallel to planes of the free layer structure and the reference layer structure.

10. The method of claim 7, wherein the free layer magnetization direction of the free layer structure is initially configured to be in a same direction of the reference layer magnetization direction, wherein the free layer magnetization is configured to rotate within the plane of the free layer structure when the pressure of the pressure medium changes.

11. The method of claim 7, wherein the free layer magnetization direction of the free layer structure is initially configured to be in an opposite direction of the reference layer magnetization direction, wherein the free layer magnetization is configured to rotate within the plane of the free layer structure when the pressure of the pressure medium changes.

12. The method of claim 7, wherein a free layer magnetization direction of the free layer structure has magnetization directions that rotates in a magnetization planes that is perpendicular to a plane of the free layer structure when the pressure of the pressure medium changes.

13. An apparatus, comprising:
   a free layer structure having one or more exposed surfaces, wherein the free layer structure has a free layer magnetization direction that changes in response to pressure exerted on the one or more surfaces by a pressure medium;
   a reference layer structure having a fixed magnetization direction;
   a tunnel barrier bonded to and between the free layer structure and the reference layer structure;
   a coupled free layer between the free layer structure and the tunnel barrier;
   a coupling modulated interlayer adjacent to and in direct contact with the free layer structure and between the coupled free layer and the free layer structure;
   a voltage source coupled to and providing power to the free layer structure and the reference layer structure;
   a current detector configured to detect the current provided by the voltage source; and
   a pressure calculating device, configured to calculate a pressure based on a current detected by the current detector.

14. The apparatus of claim 13, wherein the one or more exposed surfaces are coated with a passivation layer.

\* \* \* \* \*